(12) United States Patent
Smith et al.

(10) Patent No.: US 10,899,985 B2
(45) Date of Patent: *Jan. 26, 2021

(54) AMINE ALKENYL SUBSTITUTED SUCCINIMIDE REACTION PRODUCT FUEL ADDITIVES, COMPOSITIONS, AND METHODS

(71) Applicant: Evonik Operations GmbH, Essen (DE)

(72) Inventors: Buford Brian Smith, Evansville, WI (US); Gamini Ananda Vedage, Bethlehem, PA (US)

(73) Assignee: Evonik Operations GmbH, Essen (DE)

( * ) Notice: Subject to any disclaimer, the term of this patent is extended or adjusted under 35 U.S.C. 154(b) by 38 days.

This patent is subject to a terminal disclaimer.

(21) Appl. No.: 16/324,147

(22) PCT Filed: Aug. 25, 2017

(86) PCT No.: PCT/US2017/048633
§ 371 (c)(1),
(2) Date: Feb. 8, 2019

(87) PCT Pub. No.: WO2018/039571
PCT Pub. Date: Mar. 1, 2018

(65) Prior Publication Data
US 2019/0169514 A1 Jun. 6, 2019

Related U.S. Application Data

(60) Provisional application No. 62/379,310, filed on Aug. 25, 2016.

(51) Int. Cl.

| | |
|---|---|
| *C10L 1/236* | (2006.01) |
| *C08F 32/06* | (2006.01) |
| *C08C 19/22* | (2006.01) |
| *C10L 10/04* | (2006.01) |
| *C10L 10/06* | (2006.01) |
| *C10M 149/10* | (2006.01) |
| *C10L 1/14* | (2006.01) |
| *C10L 1/2383* | (2006.01) |
| *C10L 1/16* | (2006.01) |
| *C10M 133/56* | (2006.01) |
| *C10L 1/198* | (2006.01) |
| *C10N 20/04* | (2006.01) |
| *C10N 30/04* | (2006.01) |

(52) U.S. Cl.
CPC ............ *C10L 1/236* (2013.01); *C08C 19/22* (2013.01); *C08F 32/06* (2013.01); *C10L 1/143* (2013.01); *C10L 1/2383* (2013.01); *C10L 10/04* (2013.01); *C10L 10/06* (2013.01); *C10M 149/10* (2013.01); *C10L 1/1616* (2013.01); *C10L 1/1985* (2013.01); *C10L 2200/0423* (2013.01); *C10L 2270/023* (2013.01); *C10M 133/56* (2013.01); *C10M 2215/26* (2013.01); *C10M 2215/28* (2013.01); *C10M 2217/06* (2013.01); *C10N 2020/04* (2013.01); *C10N 2030/04* (2013.01)

(58) Field of Classification Search
CPC combination set(s) only.
See application file for complete search history.

(56) References Cited

U.S. PATENT DOCUMENTS

| | | |
|---|---|---|
| 3,172,892 A | 3/1965 | LeSuer |
| 3,202,678 A | 8/1965 | Stuart |
| 3,216,936 A | 11/1965 | LeSuer |
| 3,219,666 A | 11/1965 | Norman |
| 3,254,025 A | 5/1966 | LeSuer |
| 3,272,746 A | 9/1966 | LeSuer |
| 3,361,673 A | 1/1968 | Stuart |
| 3,676,089 A | 7/1972 | Morris |
| 4,152,499 A | 5/1979 | Boerzel et al. |

(Continued)

FOREIGN PATENT DOCUMENTS

| | | |
|---|---|---|
| EP | 0752461 A1 | 1/1997 |
| WO | 02102942 A2 | 12/2002 |

OTHER PUBLICATIONS

PCT International Search Report dated Nov. 3, 2017 corresponding to PCT Application No. PCT/US2017/048633 filed Aug. 25, 2017 (6 pages).

*Primary Examiner* — Ellen M McAvoy
*Assistant Examiner* — Chantel L Graham
(74) *Attorney, Agent, or Firm* — Andrew H. Chung; Linda S. Li; Jason S. Ngui

(57) ABSTRACT

Amine alkenyl substituted succinimide reaction product compositions including the reaction products of (1) an amine component including at least one multifunctional amine of structure (1):

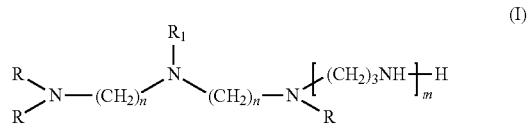

(I)

wherein each R is independently H or $CH_2CH_2CH_2NH_2$; $R_1$ is H, $CH_2CH_2CH_2NH_2$, C1-C21 alkyl, or C2-C21 alkenyl; n is 2; and m is 1 or 2 and (2) an alkenyl substituted anhydride. Additive compositions, fuel additives, fuel compositions and methods for reducing deposit formations in a fuel system are also disclosed.

14 Claims, No Drawings

(56) References Cited

U.S. PATENT DOCUMENTS

| | | | |
|---|---|---|---|
| 4,234,435 | A | 11/1980 | Meinhardt et al. |
| 4,605,808 | A | 8/1986 | Samson |
| 4,613,341 | A | 9/1986 | Zaweski et al. |
| 5,051,503 | A | 9/1991 | Schlight |
| 5,280,091 | A | 1/1994 | Dubowik et al. |
| 5,393,309 | A | 2/1995 | Cherpeck |
| 5,620,486 | A | 4/1997 | Cherpeck |
| 7,491,248 | B2 | 2/2009 | Colucci et al. |
| 8,425,629 | B2 | 4/2013 | Jackson et al. |
| 8,709,108 | B2 | 4/2014 | Claydon |
| 2009/0082234 | A1 | 3/2009 | Devlin et al. |
| 2010/0075876 | A1* | 3/2010 | Claydon ............ C10L 1/143 508/287 |
| 2010/0205852 | A1 | 8/2010 | Karl et al. |
| 2013/0305596 | A1* | 11/2013 | Amblard ............ C10L 1/19 44/411 |

* cited by examiner

AMINE ALKENYL SUBSTITUTED SUCCINIMIDE REACTION PRODUCT FUEL ADDITIVES, COMPOSITIONS, AND METHODS

This Application is a § 371 national stage of PCT International Application No. PCT/US2017/048633, filed Aug. 25, 2017, which claims the benefit of U.S. Application No. 62/379,310, filed Aug. 25, 2016, the contents of each of which are hereby incorporated by reference in their entirety into this application.

BACKGROUND OF THE INVENTION

The present disclosure is directed to a composition and a method for forming amine alkenyl substituted succinimide reaction product compositions from polyalkylene polyamines. More specifically, the present disclosure is directed to polyalkenyl succinimide compositions formed from polyalkylene polyamines.

Alkenyl succinimides are utilized extensively in many markets including corrosion inhibitors and automotive fuel and lube treatments as dispersants and detergents. They comprise the reaction products of an alkyl substituted succinic anhydride and amines of various sorts.

An alkylated anhydride is first prepared by the non-catalyzed reaction of an oligomeric or polymeric alkenyl group. Often polyisobutylene (PIB) is used, although other alkenyl substituents are used as well. Commercial standard or high vinylidene PIB is reacted with maleic anhydride or similar anhydrides in making the intermediate which is then reacted with an amine or ammonia to give the polyalkenyl succinimide product.

Polyethylene polyamines, such as diethylene triamine (DETA), triethylene tetramine (TETA), tetraethylene pentamine (TEPA), pentaethylene hexamine (PEHA), hexaethylene heptamine (HEHA), and the like, are often employed in the preparation of alkenyl succinimide fuel and lube dispersants/detergents. In this actual commercial practice, a polyethylene polyamine commonly employed is TEPA (U.S. Pat. No. 3,202,678) to provide the alkenyl succinimide dispersant/detergent which can be used alone or as a multicomponent blend with Mannich bases and potentially polyether amine detergents (U.S. Pat. No. 7,491,248).

Polyethylene polyamines are conventionally manufactured from the reaction of ammonia with either ethylene dichloride or ethanolamine. As new manufacturing assets are built to produce polyethylene polyamines, there is a tendency to favor the ethanolamine process, as it is less corrosive to the manufacturing equipment, and hence, more economical. Unfortunately, the ethanolamine process generally produces a lower yield of higher polyethylene polyamines, such as TETA and TEPA, than the ethylene dichloride process, and therefore prices for TETA and TEPA are increasing relative to the prices for other polyethylene polyamines. Furthermore, the demand for higher polyethylene polyamines, especially TEPA, is increasing. There is therefore a need for more economical alternatives to TETA, and especially TEPA, in the manufacture of alkenyl succinimide fuel and lube detergents.

Additionally, TEPA is often produced as a mixture of polyamines including cyclic pentamines like 1-(2-aminoethyl)-4-[(2-aminoethyl)amino]ethyl]-piperazine) and 1-[2-[[2-[(2-aminoethyl)amino]ethyl]-amino]ethyl]-piperazine) which can engender reactivity issues due to their steric hindrance. A non-cyclic amine reduces the issues with steric hindrances and reduces or eliminates reactivity issues.

The disclosure of the previously identified patents is hereby incorporated by reference.

A unique alkenyl succinimide reaction product based on alkyl-substituted anhydride and a non-cyclic polyalkylene polyamine is desirable in the art. This product finds utility as a fuel dispersant/detergent.

BRIEF SUMMARY OF THE INVENTION

Embodiments according to the present disclosure include amine-alkenyl substituted succinimide reaction product compositions and methods for fuel dispersant/detergent additives. These amine alkenyl substituted succinimide reaction product compositions, according to the present disclosure, provide useful performance as fuel dispersant/detergents.

An exemplary embodiment of the present disclosure includes an amine alkenyl substituted succinimide reaction product composition including a reaction product of (1) an amine component including at least one multifunctional amine of structure (I):

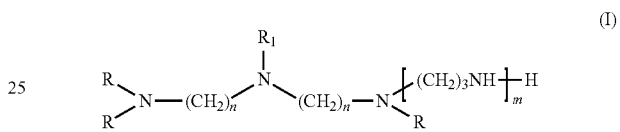

wherein each R is independently H or $CH_2CH_2CH_2NH_2$; $R_1$ is H, $CH_2CH_2CH_2NH_2$, C1-C21 alkyl, or C2-C21 alkenyl; n is 2; and m is 1 or 2 and (2) an alkenyl substituted anhydride. The alkenyl substituted anhydride component is the reaction product of an oligomeric or polymer of isobutene or other alkene up to 2000 molecular weight and maleic anhydride or other anhydrides having fewer than 18 carbons.

In one exemplary embodiment, an amine alkenyl substituted succinimide reaction product composition includes a reaction product of (1) an amine component including at least one multifunctional amine of structure (I):

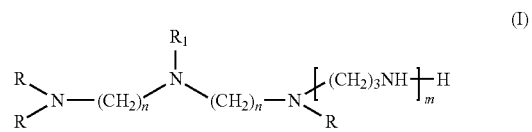

wherein each R is independently H or $CH_2CH_2CH_2NH_2$; $R_1$ is H; n is 2; and m is 1 or 2 and (2) an alkenyl substituted anhydride. The alkenyl substituted anhydride component is the reaction product of an oligomeric or polymer of isobutene or other alkene up to 2000 molecular weight and maleic anhydride or other anhydrides having fewer than 18 carbons.

While the above described amine component approximates a replacement for TEPA, as another exemplary claim, an analogous replacement for TETA includes a reaction product of (1) an amine component including at least one multifunctional amine of structure (II):

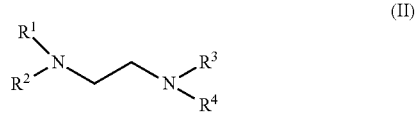

wherein R1-R4 is independently H or CH$_2$CH$_2$CH$_2$NH$_2$; and (2) an alkenyl substituted anhydride. The alkenyl substituted anhydride component is the reaction product of an oligomeric or polymer of isobutene or other alkene up to 2000 molecular weight and maleic anhydride or other anhydrides having fewer than 18 carbons.

In another exemplary embodiment, a fuel dispersant/detergent system contains an amine alkenyl substituted succinimide reaction product composition.

In another exemplary embodiment, a fuel composition includes fuel and the alkenyl succinimide fuel additive including the amine alkenyl substituted succinimide reaction product composition according to the present disclosure.

Another exemplary embodiment is a method to reduce deposit formation in a fuel system of an internal combustion engine. The method includes operating the internal combustion system with a fuel composition including fuel and the alkenyl succinimide fuel additive including the amine alkenyl substituted succinimide reaction product composition according to the present disclosure.

Other features and advantages of the present disclosure will be apparent from the following more detailed description of the preferred embodiment, taken in conjunction with the accompanying drawings which illustrate, by way of example, the principles of the invention.

DETAILED DESCRIPTION OF THE INVENTION

Provided are amine alkenyl substituted succinimide reaction product compositions and methods for fuel dispersant/detergent additives. These amine alkenyl substituted succinimide reaction product compositions, according to the present disclosure, provide useful performance as fuel dispersant/detergents. As another advantage of the present disclosure, these alkenyl succinimide compositions, which do not contain triethylenetetramine (TETA) or tetraethylenepentamine (TEPA), have physical properties including viscosity, molecular weight and amine hydrogen equivalent weight (HEW) that closely resemble conventional alkenyl succinimide products derived from triethylenetetramine (TETA) or tetraethylenepentamine (TEPA). Suitable applications include, but are not limited to, fuel additives, lube additives, and other articles.

As another advantage, the non-cyclic amine structures of the polyamine afford a more complete succinimide reaction due to non-steric hindrance compared to certain grades of TEPA.

The amine alkenyl substituted succinimide reaction product composition according to the present disclosure includes the reaction products of (1) an amine component including at least one multifunctional amine of structure (I):

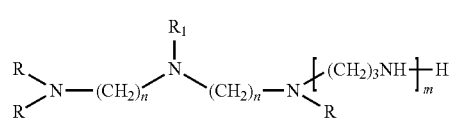

(I)

wherein each R is independently H or CH$_2$CH$_2$CH$_2$NH$_2$; R$_1$ is H, CH$_2$CH$_2$CH$_2$NH$_2$, C1-C21 alkyl, or C2-C21 alkenyl; n is 2; and m is 1 or 2 and (2) an alkenyl substituted anhydride. The alkenyl substituted anhydride component is the reaction products of an oligomeric or polymer of isobutene or other alkene up to 2000 molecular weight and maleic anhydride or other anhydrides having fewer than 18 carbons.

The amine component used to prepare the amine alkenyl substituted succinimide reaction product includes at least one multifunctional amine of structure (I). In one exemplary embodiment of the present disclosure, R1 is H in structure (I). In another exemplary embodiment, R1 is CH$_2$CH$_2$CH$_2$NH$_2$. In yet another embodiment, R1 is a substituted or un-substituted benzyl group of C7-C21. In another embodiment, R1 is a C1-C21 alkyl, or C2-C21 alkenyl group derived from the reaction of mono-glycidyl ether of corresponding alcohol or phenol with the secondary amine NH before R1 is attached.

The multifunctional amines of structure (I) of the present disclosure include, but are not limited to, N-3-aminopropyl diethylenetriamine (N4); N-3-aminopropyl-[N'-3-[N-3-aminopropyl] aminopropyl]diethylenetriamine (N6); N,N'-bis(3-aminopropyl)diethylenetriamine (N5); N,N-bis(3-aminopropyl)diethylenetriamine (N5); N,N,N'-tris(3-aminopropyl)diethylenetriamine (N6); N,N',N''-tris(3-aminopropyl)diethylenetriamine (N6); N,N,N',N'-tetrakis(3-aminopropyl)diethylenetriamine (N7); N,N-bis(3-aminopropyl)-[N'-3-[N-3-aminopropyl]aminopropyl]-[N'-3-aminopropyl]diethylenetriamine (N8); N-3-aminopropyl-[N'-3-[N-3-aminopropyl]aminopropyl]-[N'-3-aminopropyl]diethylenetriamine (N7); These multifunctional amines may be prepared by the Michael reaction of diethylenetriamine with acrylonitrile, followed by hydrogenation over metal catalysts as is well known to those skilled in the art. It is also known to those skilled in the art, the multifunctional amines comprise a mixture of amine represented by structure (I) having 4 nitrogen atoms (N4), having 5 nitrogen atoms (N5), and having at least 6 nitrogen atoms (N6 and higher amine). Each of amine N4, N5, N6 and higher amines in the mixture may contain more than one structural isomers. A representative reaction scheme is shown below.

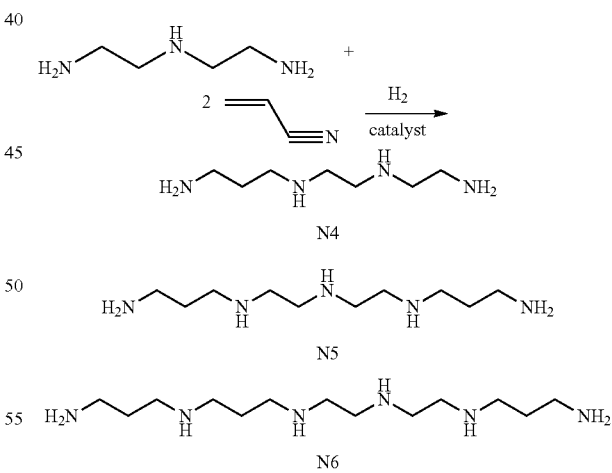

A suitable multifunctional amine represented by structure (I) for use as the amine component to prepare the amine alkenyl substituted succinimide reaction product is N,N'-bis(3-aminopropyl)diethylenetriamine (N5). A particularly suitable multifunctional amine represented by structure (I) is a mixture comprising in a parts-by-weight (pbw) ratio of 0 to 50 pbw amine having 4 nitrogen atoms (N4), 40 to 95 pbw amine having 5 nitrogen atoms (N5), and 0 to 50 pbw amine having at least 6 nitrogen atoms (N6 and higher amine), or a particularly suitable ratio of 0 to 30 pbw amine having 4 nitrogen atoms (N4), 40 to 95 pbw amine having 5 nitrogen atoms (N5), and 0 to 50 pbw amine having at least 6 nitrogen atoms (N6 and higher amine), or a suitable ratio of 0 to 20 pbw amine having 4 nitrogen atoms (N4), 50 to 95 pbw amine having 5 nitrogen atoms (N5), and 0 to 40 pbw amine having at least 6 nitrogen atoms (N6 and higher amine), or a suitable ratio of 0 to 20 pbw amine having 4 nitrogen atoms (N4), 50 to 90 pbw amine having 5 nitrogen atoms (N5), and 3 to 35 pbw amine having at least 6 nitrogen atoms (N6 and higher amine), or a suitable ratio of 1 to 15 pbw amine having 4 nitrogen atoms (N4), 50 to 90 pbw amine having 5 nitrogen atoms (N5), and 5 to 35 pbw amine having at least 6 nitrogen atoms (N6 and higher amine). Such a mixture may be prepared by the reaction sequence described above for making the multifunctional amine without the need to conduct a distillation or other process of separation, except for the optional removal of low molecular weight side products of the reaction which are more volatile than N-3-aminopropyldiethylenetriamine. It will be recognized by those skilled in the art that small quantities of other products of hydrogenation may be present in the mixture.

While the above described amine component (I) approximates a replacement for TEPA, an analogous replacement for TETA includes a reaction product of (1) an amine component including at least one multifunctional amine of structure (II):

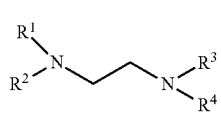

(II)

The amine alkenyl substituted succinimide reaction product composition according to the present disclosure includes the reaction products of (1) an amine component including at least one multifunctional amine of structure (II) wherein each R is independently H or $CH_2CH_2CH_2NH_2$; and (2) an alkenyl substituted anhydride. The alkenyl substituted anhydride component is the reaction products of an oligomeric or polymer of isobutene or other alkene up to 2000 molecular weight and maleic anhydride or other anhydrides having fewer than 18 carbons.

The amine component (II) used to prepare the amine alkenyl substituted succinimide reaction product includes at least one multifunctional amine of structure (II). In one exemplary embodiment of the present disclosure, R1 and R3 is H in structure (II) while R2 and R4 are $CH_2CH_2CH_2NH_2$. In another exemplary embodiment, R1 is H and R2-R4 are $CH_2CH_2CH_2NH_2$. In another exemplary embodiment, one of the R groups being $CH_2CH_2CH_2NH_2$ is derivatized with a substituted or un-substituted benzyl group of C7-C21. In yet another embodiment, one of the R groups being $CH_2CH_2CH_2NH_2$ is derivatized with a C1-C21 alkyl, or C2-C21 alkenyl group arising from the reaction of monoglycidyl ether of corresponding alcohol or phenol with the amine.

The amine alkenyl substituted succinimide reaction product composition require an alkenyl substituted anhydride intermediate. The alkenyl substituted anhydrides are readily made by first reacting an olefinically unsaturated hydrocarbon of a desired molecular weight with maleic anhydride to form an alkenyl substituted anhydride. Reaction temperatures of about 100° C. to about 250° C. may be used. With higher boiling olefinically-unsaturated hydrocarbons, good results are obtained at about 200° C. to about 250° C. This reaction may be promoted by the addition of chlorine. Alkenyl succinimides in which the succinic group contains a hydrocarbyl substituent containing at least 40 carbon atoms are described, for example, in U.S. Pat. Nos. 3,172,892; 3,202,678; 3,216,936; 3,219,666; 3,254,025; 3,272,746; 4,234,435; 4,613,341; and 5,575,823, the disclosures of all of which are hereby incorporated by reference.

Typical olefins include, but are not limited to, cracked wax olefins, linear alpha olefins, branched chain alpha olefins, polymers and copolymers of lower olefins. The olefins may be chosen from ethylene, propylene, butylene, such as isobutylene, 1-octane, 1-hexene, 1-decene, and the like. Useful polymers and/or copolymers include, but are not limited to, polypropylene, polybutenes, polyisobutene, ethylene-propylene copolymers, ethylene-isobutylene copolymers, propylene-isobutylene copolymers, ethylene-1-decene copolymers, and the like. One particularly suitable olefin includes polyisobutene.

Alkenyl substituted anhydride substituents have also been made from olefin terpolymers. Very useful products may be made from ethylene-$C_{3-12}$ alpha olefin-$C_{5-12}$ non-conjugated diene terpolymers; such as ethylene-propylene-1,4-hexadiene terpolymer; ethylene-propylene-1,5-cyclooctadiene terpolymer; and ethylene-propylene or bornene terpolymers.

In one embodiment, the alkenyl substituted anhydride substituents are derived from butene polymers, for example, polymers of isobutylene. Suitable polyisobutenes for use in preparing the succinimide-acids of the present disclosure may in one embodiment include those polyisobutenes that comprise at least about 20% of the more reactive methylvinylidene isomer, for example, at least 50%, and as a further example at least 70%. Suitable polyisobutenes include those prepared using $BF_3$ catalysts. The polyisobutene polymers may be up to 2000 by number average molecular weight. The preparation of such polyisobutenes in which the methylvinylidene isomer comprises a high percentage of the total composition is described in U.S. Pat. Nos. 4,152,499 and 4,605,808, the disclosures of which are hereby incorporated by reference.

The molecular weight of the alkenyl substituted anhydride substituent may vary over a wide range. The hydrocarbyl group may have a molecular weight of less than 600. An exemplary range is about 100 to about 300 number average molecular weight, for example, from about 150 to about 275, as determined by gel permeation chromatography (GPC). In an aspect, the number average molecular weight of the hydrocarbyl group is less than about 250. Thus, hydrocarbyl groups of predominantly $C_4$-$C_{36}$ are useful herein with $C_{14}$-$C_{18}$ hydrocarbyl groups being particularly effective on the succinimide in providing improved lubricity to the low sulfur middle distillate fuel. In an aspect, hydrocarbyl groups of up to about $C_{24}$ are also useful.

Carboxylic reactants other than maleic anhydride may be employed such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and 1,8-naphthalic anhydride, including the corresponding acid halides and lower aliphatic esters.

For example, alkenyl substituted anhydrides may be prepared by the thermal reaction of a polyolefin and maleic anhydride, as described, for example, in U.S. Pat. Nos. 3,361,673 and 3,676,089, the disclosures of which are incorporated by reference. Alternatively, alkenyl substituted anhydrides may be prepared by the reaction of chlorinated polyolefins with maleic anhydride, as described, for example, in U.S. Pat. No. 3,172,892, the disclosure of which is incorporated by reference. A further discussion of alkenyl substituted anhydrides may be found, for example, in U.S. Pat. Nos. 4,234,435; 5,620,486 and 5,393,309, the disclosures of which are incorporated by reference. Commercially available alkenyl succinic anhydrides include the Dovermulse® products produced by Dover Chemical Corp., made by a non-chlorine process.

The mole ratio of maleic anhydride to olefin unsaturated hydrocarbon may vary widely. The mole ratio may vary from about 5:1 to about 1:5, for example, from about 3:1 to about 1:3, and as a further example the maleic anhydride may be used in stoichiometric excess to force the reaction to completion. The unreacted maleic anhydride may be removed by vacuum distillation.

In some embodiments according to the present disclosure, the multifunctional amines include a mixture of multifunctional amines. In other embodiments according to the present disclosure, the alkenyl succinimide composition is based on a mixture of multifunctional amines.

If desired, the amine alkenyl substituted succinimide reaction product composition may be modified by incorporation of other multifunctional amines having two (2) or more active amine hydrogens. Non-limiting examples of multifunctional amines having two (2) or more active amine hydrogens that are within the scope of the present disclosure include, but are not limited to, an aliphatic amine, a cycloaliphatic amine, an aromatic amine, a poly(alkylene oxide) diamine or triamine, an alkenyl succinimide derivative of an aliphatic amine, an alkenyl succinimide derivative of a cycloaliphatic amine, an alkenyl succinimide derivative of an aromatic amine, a polyamide derivative of an aliphatic amine with a fatty acid, a polyamide derivative of a cycloaliphatic amine with a fatty acid, a polyamide derivative of an aromatic amine with a fatty acid, an amidoamine derivative of an aliphatic amine with a fatty acid, an amidoamine derivative of a cycloaliphatic amine with a fatty acid, an amidoamine derivative of an aromatic amine with a fatty acid, an amine adduct derivative of an aliphatic amine with a mono-glycidyl ether, an amine adduct derivative of a cycloaliphatic amine with a mono-glycidyl ether, or an amine adduct derivative of an aromatic amine with a mono-glycidyl ether, or any combination thereof.

Specific examples of multifunctional amines having two (2) or more active amine hydrogens include, but are not limited to, ethylenediamine, diethylenetriamine, triethylenetetramine, tetraethylenepentamine, higher polyethyleneamines, aminoethylpiperazine, meta-xylylenediamine, the various isomers of diamine-cyclohexane, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly (cyclohexyl-aromatic)amines (MBPCAA) described in U.S. Pat. No. 5,280,091, which is incorporated by reference, 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexane-diamine, 3,5,5-trimethyl-1,6-hexanediamine, 2-methyl-1,5-pentanediamine, bis-(3-amino-propyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diamino-cyclohexane, the poly (alkylene oxide)diamines and triamines (such as, for example, JEFFAMINE® D-230, JEFFAMINE® D-400, JEFFAMINE® D-2000, JEFFAMINE® D-4000, JEFFAMINE® T-403, JEFFAMINE® EDR-148, JEFFAMINE® EDR-192, JEFFAMINE® C-346, JEFFAMINE® ED-600, JEFFAMINE® ED-900, JEFFAMINE® ED-2001) and also aminopropylated ethylene glycols, aminopropylated propanediols, aminopropylated butanediols, aminopropylated hexanediols, aminopropylated polyethylene glycols, aminopropylated polypropylene glycols and aminopropylated polybutanediols. JEFFAMINE® is a registered trademark of Huntsman Corporation. The amine alkenyl substituted succinimide reaction product composition may be modified by incorporating these polyamines in the reaction.

Other suitable ingredients for inclusion in the reaction composition include polyamines, such as, an aliphatic diamine having one primary or secondary amino group and at least one tertiary amino group in the molecule. Examples of suitable polyamines include, but are not limited to, N,N,N",N"-tetraalkyldialkylenetriamines (two terminal tertiary amino groups and one central secondary amino group), N,N,N',N"'-tetraalkyltrialkylenetetramines (one terminal tertiary amino group, two internal tertiary amino groups and one terminal primary amino group), N,N,N',N",N"'-pentaalkyltrialkylenetetramines (one terminal tertiary amino group, two internal tertiary amino groups and one terminal secondary amino group), N,N-dihydroxyalkyl-alpha, omega-alkylenediamines (one terminal tertiary amino group and one terminal primary amino group), N,N,N'-trihydroxyalkyl-alpha, omega-alkylenediamines (one terminal tertiary amino group and one terminal secondary amino group), tris(dialkylaminoalkyl)aminoalkylmethanes (three terminal tertiary amino groups and one terminal primary amino group), and similar compounds, wherein the alkyl groups are the same or different and typically contain no more than about 12 carbon atoms each, and which, for example, contain from 1 to 4 carbon atoms each. In an aspect, these alkyl groups may be methyl and/or ethyl groups. In another aspect, polyamine reactants may be N,N-dialkyl-alpha, omega-alkylenediamine, such as those having from 3 to about 6 carbon atoms in the alkylene group and from 1 to about 12 carbon atoms in each of the alkyl groups, which, for example, may be the same but which may be different. In an aspect, N,N-dimethyl-1,3-propanediamine and N-methyl piperazine may be used.

Examples of other polyamines having one reactive primary or secondary amino group that may participate in the alkenyl succinimide reaction, and at least one sterically hindered amino group that cannot participate directly in the alkenyl succinimide reaction to any appreciable extent include N-(tert-butyl)-1,3-propanediamine, N-neopentyl-1,3-propanediamine, N-(tert-butyl)-1-methyl-1,2-ethanediamine, N-(tert-butyl)-1-methyl-1,3-propanediamine, and 3,5-di(tert-butyl)aminoethylpiperazine. The amine alkenyl substituted succinimide reaction product composition may be modified by incorporating these polyamines in the reaction. It is necessary to account for the differences in molecular weight of the various amines to attain the proper ratio of equivalents of amine/polyamine to equivalents of alkenyl succinic anhydride. The components are reacted in a ratio of moles of alkenyl anhydride component to multifunctional amine from about 0.5-3:0.5-1.0. These amines may be incorporated at up to 75% replacement level of the exemplarily claimed amine.

In one exemplary embodiment, the present disclosure provides an alkenyl succinimide composition comprising the contact product of: (i) an alkenyl succinimide comprising the reaction products of (1) an amine component including at least one multifunctional amine of structures (I) and/or (II) and (2) an alkenyl succinic anhydride; and (ii) at least one additional multifunctional amine having two or three or more active amine hydrogens or an amine having at least one primary and/or secondary amine as well as at least one tertiary amine.

The term "contact product" is used herein to describe compositions wherein the components are contacted together in any order, in any manner, and for any length of time. For example, the components may be contacted by blending or mixing. Further, contacting of any component may occur in the presence or absence of any other component of the compositions or formulations described herein. Still further, two or more of the components of the contact product may react to form other components composing the composition. Combining additional materials or components may be done by any method known to one of skill in the art.

It is also possible to modify the amine alkenyl substituted succinimide reaction product composition of the present disclosure by reacting up to 50% of the amine hydrogens with mono-functional epoxides. This is a practice known as "adduction". Styrene oxide, cyclohexene oxide, and the glycidyl ethers of phenol, the cresols, tert-butylphenol and other alkyl phenols, butanol, 2-ethylhexanol, and C8 to C14 alcohols, and the like are useful. Hydrogenation of the alkenyl substituent unsaturation also may be done.

Amine alkenyl substituted succinimide reaction product compositions, in accordance with the present disclosure, may further comprise at least one multifunctional amine. "Multifunctional amine", as used herein, describes compounds with amine functionality and which contain three (3) or more active amine hydrogens.

Non-limiting examples of multifunctional amines having three (3) or more active amine hydrogens that are within the scope of the present disclosure include, but are not limited to, an aliphatic amine, a cycloaliphatic amine, an aromatic amine, a poly(alkylene oxide) diamine or triamine, another alkenyl succinimide derivative of an aliphatic amine, another alkenyl succinimide derivative of a cycloaliphatic amine, another alkenyl succinimide derivative of an aromatic amine, a polyamide derivative of an aliphatic amine with a fatty acid, a polyamide derivative of a cycloaliphatic amine with a fatty acid, a polyamide derivative of an aromatic amine with a fatty acid, an amidoamine derivative of an aliphatic amine with a fatty acid, an amidoamine derivative of a cycloaliphatic amine with a fatty acid, an amidoamine derivative of an aromatic amine with a fatty acid, an amine adduct derivative of an aliphatic amine with a glycidyl ether, an amine adduct derivative of a cycloaliphatic amine with a glycidyl ether, or an amine adduct derivative of an aromatic amine with a glycidyl ether, and the like, or any combination thereof.

The reaction between the amine according to formula (I) and/or (II), and optionally a multifunctional amine, and the alkenyl substituted anhydride in one embodiment may be carried out by mixing the components by charging the amine component to the amine component to the anhydride at up to 100° C. and heating the mixture to a temperature high enough to cause a reaction to occur but not so high as to cause decomposition of the reactants or products, or the anhydride may be heated to reaction temperature and the amine added over an extended period. A suitable temperature for the reaction is about 100° C. to about 210° C. One embodiment includes performing the reaction at a temperature high enough to distill out water formed in the reaction mixture which is 180-210° C. To aid in mass transfer, a solvent such as Aromatic 100 or 150 from Exxon Mobil at levels up to 50% by weight may be added.

In one embodiment, the succinimide reaction mixture containing the amine alkenyl substituted succinimide reaction product composition according to the present disclosure is an additive composition. The additive composition of the present disclosure comprises an alkenyl succinimide reaction product. Depending on the application or utility of the additive composition, the additive composition may further comprise one or more additional components. An additive composition for use in a lubricant may further comprise a diluent and/or one or more performance additives. The diluent may be a lubricating oil, a solvent, or a mixture thereof. The lubricating oil may be a mineral oil from refining of petroleum, a synthetic oil to include a poly(alpha-olefin) or an ester of a carboxylic acid, or a mixture thereof. The solvent may be an aliphatic hydrocarbon, an aromatic hydrocarbon, an oxygen containing compound to include an alcohol, water, or a mixture thereof. Performance additives for a lubricant may include metal containing detergents, nitrogen containing dispersants, wear and oxidation and corrosion inhibitors, and various surfactants. An additive composition for use in a fuel may further comprise a diluent and/or one or more performance additives as described herein below for a fuel additive concentrate composition.

A fuel additive concentrate composition of the present disclosure for an internal combustion engine comprises a solvent, the additive composition comprising the alkenyl succinimide reaction product according to the present disclosure, and optionally one or more additional fuel additives. The solvent and optional fuel additive or additives that are present in the concentrate composition will largely depend on the type of internal combustion engine that the concentrate composition is to be used in. The solvent may be an aliphatic hydrocarbon, an aromatic hydrocarbon, a glycol ether, an alcohol, or a mixture thereof. The solvent, for example, may include an aromatic naphtha, an aliphatic kerosene, toluene, xylenes, aliphatic alcohols having 1 to 10 carbon atoms, and mixtures thereof. The solvent is normally present in the concentrate composition in an amount to provide a concentrate composition that is homogeneous and sufficiently fluid for transferring and handling. The solvent may be present in the concentrate composition at 5 to 90% by weight, and in other instances at 10 to 70% by weight, and at 15 to 50% by weight. Carrier fluids such as those described in U.S. Pat. No. 8,425,629, which is incorporated by reference, may also be employed. Additional fuel additives commonly used in gasoline fuel compositions may include an anti-knock additive, such as lead and cyclopentadienyl manganese tricarbonyl compounds, and a valve seat recession additive, such as alkali metal sulfosuccinate salts. Additional fuel additives commonly used in diesel fuel compositions may include a cetane improver, such as organic nitrate and nitrite compounds, a cold flow improver, such as ethylene-vinyl acetate copolymers, smoke suppressants, and antifoaming agents, such as silicone fluids. Additional fuel additives commonly used in both diesel and gasoline fuel compositions may include antioxidants, such as hindered phenols, supplemental detergents, such as Mannich base and hydrocarbyl substituted amines and polyetheramines, corrosion inhibitors, such as alkenylsuccinic acids, antistatic agents, biocides, demulsifiers, fluidizers, such as mineral oils and polyethers and polyetheramines, and lubricity agents, such as tall oil fatty acids. Fuel additives will generally be present in a concentrate composition and fuel composition in an amount that improves performance based on several factors to include engine type, type of engine service conditions, and fuel quality. The amine alkenyl substituted succinimide reaction product composition according to the present disclosure may be present in the concentrate composition at 5 to 90% by weight, and in other instances at 7 to 70% by weight, and at 9 to 50% by weight. The additional fuel additive or additives may each be present in the concentrate composition depending on its or their function at 0.01 to 90% by weight, and in other instances at 0.01 to 70% by weight, and at 0.01 to 50% by weight.

A fuel composition according to the present disclosure for an internal combustion engine comprises a major amount of a fuel and a minor amount of the above described additive composition that comprises the amine alkenyl substituted succinimide reaction product composition according to the present disclosure. In another embodiment according to the present disclosure, a fuel composition for an internal combustion engine comprises a major amount of a fuel and a minor amount of the above described fuel additive concentrate composition that comprises solvent, additive composition comprising the amine alkenyl substituted succinimide reaction product composition according to the present disclosure, and optionally one or more additional fuel additives. The fuel may be a normally liquid fuel. The normally liquid fuel may be a hydrocarbon fuel, a nonhydrocarbon fuel, or a mixture thereof. The hydrocarbon fuel may be a petroleum distillate to include a gasoline as defined by ASTM specification D4814 or a diesel fuel as defined by ASTM specification D975. The hydrocarbon fuel may be a hydrocarbon prepared by a gas to liquid process to include, for example, hydrocarbons prepared by a process, such as a Fischer-Tropsch Process. The nonhydrocarbon fuel may be an oxygen-containing composition, often referred to as an oxygenate, to include alcohols, ethers, ketones, esters of carboxylic acids, nitroalkanes, and mixtures thereof. The nonhydrocarbon fuel, for example, may include methanol, ethanol, methyl t-butyl ether, nitromethane, and transesterified oils from plants and animals, such as rapeseed methyl ester and soybean methyl ester. Mixtures of hydrocarbon and nonhydrocarbon fuels may include gasoline and methanol and/or ethanol, diesel fuel and ethanol, and diesel fuel and a transesterified plant oil, such as rapeseed methyl ester. In an embodiment according to the present disclosure, the fuel is an emulsion of water in a hydrocarbon fuel, a nonhydrocarbon fuel, or a mixture thereof. The alkenyl succinimide reaction product according to the present disclosure may be present in the fuel composition at 10 to 2,000 ppm (parts per million) by weight, and in other instances may be present at 50 to 800 ppm by weight, 65 to 700 ppm by weight, 80 to 500 ppm by weight, and 90 to 250 ppm by weight. Each of the additional fuel additives may be present in the fuel composition depending on their function at 0.01 to 10,000 ppm by weight, and in other instances at 0.01 to 5,000 ppm by weight, and at 0.01 to 1,000 ppm by weight.

The above described fuel additive concentrate composition and fuel composition according to the present disclosure may be prepared by admixing or mixing the components of the composition at ambient to elevated temperatures generally up to 60° C. until the composition is homogeneous or substantially homogenous.

An embodiment according to the present disclosure includes a method to reduce deposit formation in a fuel system of an internal combustion engine and includes operating the engine with the above described fuel composition including an additive composition that comprises the amine alkenyl substituted succinimide reaction product composition according to the present disclosure. Another embodiment according to the present disclosure includes a method to reduce deposit formation in the fuel system of an internal combustion engine and comprises operating the engine with the above described fuel composition comprising a fuel additive concentrate composition that comprises solvent, additive composition comprising the amine alkenyl substituted succinimide reaction product composition according to the present disclosure, and optionally one or more additional fuel additives. The fuel composition and method according to the present disclosure, which employ an amine alkenyl substituted succinimide reaction product derived from conventional and/or high vinylidene PIBs, are effective in reducing deposits in a fuel system of an internal combustion engine.

The disclosure is further illustrated by the following examples, which are not to be construed as imposing limitations to the scope of this disclosure. Various other aspects, embodiments, modifications, and equivalents thereof which, after reading the description herein, may suggest themselves to one of ordinary skill in the art without departing from the spirit of the present disclosure or the scope of the appended claim.

EXAMPLES

Synthesis Examples: Amine value is determined by a Metrohm titrator, and chemical composition of the amine alkenyl substituted succinimide intermediates and products are analyzed by nuclear magnetic resonance (NMR). The NMR experiments are performed at ambient temperature employing the Bruker DRX-400 FT-NMR spectrometer equipped with a 10 mm BBO probe. Quantitative $^{13}$C NMR data is acquired using inverse-gated decoupling, a 45° pulse, and a 6 second relaxation delay. The samples are dissolved in chloroform-d with a relaxation agent. The chemical shift scale was referenced to the solvent peak. The composition of the multifunctional amine represented by Structure (I) was analyzed by gas chromatograph (GC).

Example 1

Synthesis of Multifunctional Amine Represented by Structure (I) and Corresponding Alkenyl Succinimide Step 1. Cyanoethylation of Diethylenetriamine A 1.8 L Mettler-Toledo RC1 reactor was charged with 240 g diethylenetriamine (2.3 moles) and 55.5 g water (3.1 moles) then sealed. The agitator was started, and the reactor was purged with nitrogen then heated to 70° C. When the temperature was at 70° C., 259.1 g acrylonitrile (4.9 moles) was charged from an Isco pump over 4 hours. The reaction mixture was stirred for 30 minutes at 70° C. after the addition was completed. The product then was cooled to ambient temperature and discharged from the reactor into a bottle. Analysis of a sample by GC showed that the mixture contained 0.7% acrylonitrile, 2.9% monocyanoethylated diethylenetriamine, 82.2% dicyanoethylated diethylenetriamine (mixture of isomers), and 12.8% tricyanoethylated diethylenetriamine (mixture of isomers).

Step 2: Semi-Batch Hydrogenation of Cyanoethylated Diethylenetriamine

A 1.8 L Mettler-Toledo RC1 reactor was charged with 250 g isopropanol, 8 g Raney® cobalt 2724 catalyst, and 20 g 10 wt % aqueous LiOH H$_2$O solution. The reactor was sealed then purged three times with nitrogen, pressure checked, purged three times with hydrogen then pressurized with hydrogen to 500 psig and heated to 140° C. The agitator speed was set to 1000 rpm. When the reaction mixture was at temperature, the hydrogen pressure was increased to 754 psig. Cyanoethylated diethylenetriamine from step 1 above, 800 g, was charged to the reactor over 2 hours from an Isco pump. After the charge was completed, the reaction mixture was held at temperature and pressure for 3 minutes. The reactor was cooled, vented, purged with nitrogen, and the contents were discharged through a filter. Water, isopropanol solvent, and low molecular weight components were removed by vacuum distillation. The final product contained 2.2% monoaminopropylated diethylenetriamine (N4), 79.1% diaminopropylated diethylenetriamine (N5) (mixture of isomers), and 15.2% triaminopropylated diethylenetriamine (N6) (mixture of isomers) based on GC analysis. The monoaminopropylated product (N4) is thus minimized.

Step 3. Synthesis of PIB Succinimide From Product of Steps 1-2

A 1 liter round-bottomed flask equipped with a Dean-Starke trap was charged with 269 g (0.25 mole) polyisobutene succinic anhydride (Dovermulse H 1013 P from Dover Chemical Corp., 1077 mwt) and reacted with 55 g (0.25 mole) bis-3(aminopropyl) diethylenetriamine (Step 2 product) at 185-200° C. for 5 hours until the requisite amount of water (0.25 mole, 4.5 g) was evolved and captured. The product yield and water captured determined the extent of reaction to be the expected near complete conversion.

Testing of Alkenyl Succinimides

The amine alkenyl substituted succinimide reaction product composition prepared in Step 3 is evaluated for effectiveness as a fuel dispersant/detergent additive. Mixtures were prepared by combining and mixing the components given in examples below. Testing was performed at Southwest Research Institute (SwRI®) using their Induction System Deposit test (ISD) for detergency tendencies in gasoline, employing the ISD apparatus and protocols developed at SwRI®.

Gasoline Additive Detergency Tests

The amine alkenyl substituted succinimide reaction product composition of Step 3 was blended with a carrier fluid Exxal 13 poly (24) propoxylate (prepared by Evonik) and Aromatic 150 Solvent (Exxon-Mobil) with the levels of each component being in equal ratios by weight (1:1:1, respectively). Further, the amine alkenyl substituted succinimide reaction product composition of Step 3 was blended with a carrier fluid Exxal 13 poly (24) propoxylate (prepared by Evonik) and Aromatic 150 Solvent (Exxon-Mobil) with the level of each component being in a ratio by weight of 0.5:1:1, respectively. Blend amounts of these formulations into a standard minimally additized gasoline ranged from 1000-3000 ppm. 100 ml of the standard fuel was initially run to "dirty-up" the ISD, then after inspection, 100 ml of the standard fuel was additized with the alkenyl succinimide formulation and run through the same apparatus. Inspection determined the degree of ISD "clean-up" that occurred and illustrates the usefulness of the alkenyl succinimide in gasoline fuel detergency since further deposits were reduced or abated after the "dirty-up" step when employed at a 1500 ppm treatment level.

Gasoline ISD Test Results

SwRI® analyzed the above described formulations (1:1:1, unfiltered and 0.5:1:1, filtered) for ratios of succinimide to carrier fluid to Aromatic 150, respectively, using FTM 500.1 test procedures for an Induction System Depository Apparatus (ISD). A blend of Halterman 65$^{th}$ Phillips "J" fuel was used as a base fuel for gasoline testing. "Dirty-up/clean-up" data was provided at 190 C. The less concentrated blend ratio formulation gave results that demonstrate the complete abatement of further deposit formation when used at 1500 ppm (wt.-wt.) treatment levels as 1.0 mg of "dirty up" deposits did not increase after employing the treatment.

All above-mentioned references are hereby incorporated by reference herein.

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An amine alkenyl substituted succinimide reaction product composition comprising a reaction product of (1) an amine component comprising at least one multifunctional amine of structure (I):

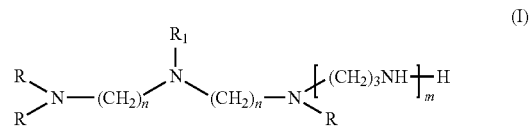

where each R is independently H or $CH_2CH_2CH_2NH_2$; $R_1$ is H, $CH_2CH_2CH_2NH_2$, C1-C21 alkyl, or C2-C21 alkenyl; n is 2; and m is 1 or 2 and (2) an alkenyl substituted anhydride comprising an oligomeric or polymeric alkenyl substituent being a polyisobutylene of 300-2000 molecular weight.

2. The composition of claim 1, wherein the alkenyl substituted anhydride is maleic anhydride.

3. The composition of claim 1, wherein in which the alkenyl substituted anhydride is an aliphatic or aromatic carboxylic acid or anhydride of up to 18 carbons.

4. The composition of claim 1, wherein the amine component comprises a compound selected from the group consisting of N-3-aminopropyl diethylenetriamine; N-3-aminopropyl-[N'-3-[N-3-aminopropyl]aminopropyl]diethylenetriamine; N,N'-bis(3-aminopropyl)diethylenetriamine; N,N-bis(3-aminopropyl)diethylenetriamine; N,N,N'-tris(3-aminopropyl)diethylenetriamine; N,N',N''-tris(3-aminopropyl)diethylenetriamine; N,N,N',N'-tetrakis(3-aminopropyl) diethylenetriamine; N,N-bis(3-aminopropyl)-[N'-3-[N-3-aminopropyl]aminopropyl]-[N'-3-aminopropyl] diethylenetriamine; N-3-aminopropyl-[N'-3-[N-3-aminopropyl]aminopropyl]-[N'-3-aminopropyl] diethylenetriamine; and combinations thereof.

5. The composition of claim 1, wherein R1 is H or $CH_2CH_2CH_2NH_2$.

6. The composition of claim 1, wherein the amine component comprises a mixture of amines of structure according to formula (I) in a parts-by-weight (pbw) ratio of 0 to 50 pbw amine having 4 nitrogen atoms, 40 to 95 pbw amine having 5 nitrogen atoms, 0 to 50 pbw amine having at least 6 nitrogen atoms.

7. The composition of claim 1, wherein the amine component comprises a mixture of amines of structure according to formula (I) in a parts-by-weight (pbw) ratio of 0 to 20 pbw amine having 4 nitrogen atoms, 50 to 95 pbw amine having 5 nitrogen atoms, 3 to 35 pbw amine having at least 6 nitrogen atoms.

8. The composition of claim 1, wherein the amine component and the alkenyl anhydride component are reacted in a ratio of moles of alkenyl anhydride component to multifunctional amine are from about 0.5-3:0.5-1.0.

9. The composition of claim 1, wherein the composition comprises a reaction product of the amine component, the alkenyl anhydride and (3) at least one additional multifunctional amine, the multifunctional amine having three or more active amine hydrogens or an amine having at least one primary and/or secondary amine as well as at least one tertiary amine.

10. The composition of claim 9, wherein the at least one multifunctional amine is selected from the group consisting of an aliphatic amine, a cycloaliphatic amine, an aromatic amine, a poly(alkylene oxide) diamine or triamine, an alkenyl succinimide derivative of an aliphatic amine, an alkenyl succinimide derivative of a cycloaliphatic amine, an alkenyl succinimide derivative of an aromatic amine, an amine adduct derivative of an aliphatic amine with a glycidyl ether, an amine adduct derivative of a cycloaliphatic amine with a glycidyl ether, or an amine adduct derivative of an aromatic amine with a glycidyl ether, and the like, and combinations thereof.

11. The composition of claim 9, wherein the at least one multifunctional amine is selected from the group consisting of ethylenediamine, diethylenetriamine, triethylenetetramine, tetraethylenepentamine, higher polyethyleneamines, am inoethylpiperazine, meta-xylylenediamine, the various isomers of diamine-cyclohexane, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly (cyclohexyl-aromatic)amines, 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexane-diamine, 3,5,5-trimethyl-1,6-hexanediamine, 2-methyl-1,5-pentanediamine, bis-(3-amino-propyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diamino-cyclohexane, the poly(alkylene oxide)diamines and triamines, aminopropylated ethylene glycols, aminopropylated propanediols, aminopropylated butanediols, aminopropylated hexanediols, aminopropylated polyethylene glycols, aminopropylated polypropylene glycols, aminopropylated polybutanediols, N,N-dimethyl-1,3-propanediamine, and N-methyl piperazine.

12. An alkenyl succinimide fuel additive dispersant/detergent comprising the composition of claim 1.

13. A fuel composition comprising fuel and the alkenyl succinimide fuel additive of claim 12.

14. A method to reduce deposit formation in a fuel system of an internal combustion engine comprising operating the internal combustion system with a fuel according to claim 13.

* * * * *